Jan. 6, 1942.        J. S. IRVING        2,269,268
BRAKE
Filed June 15, 1939         3 Sheets-Sheet 1
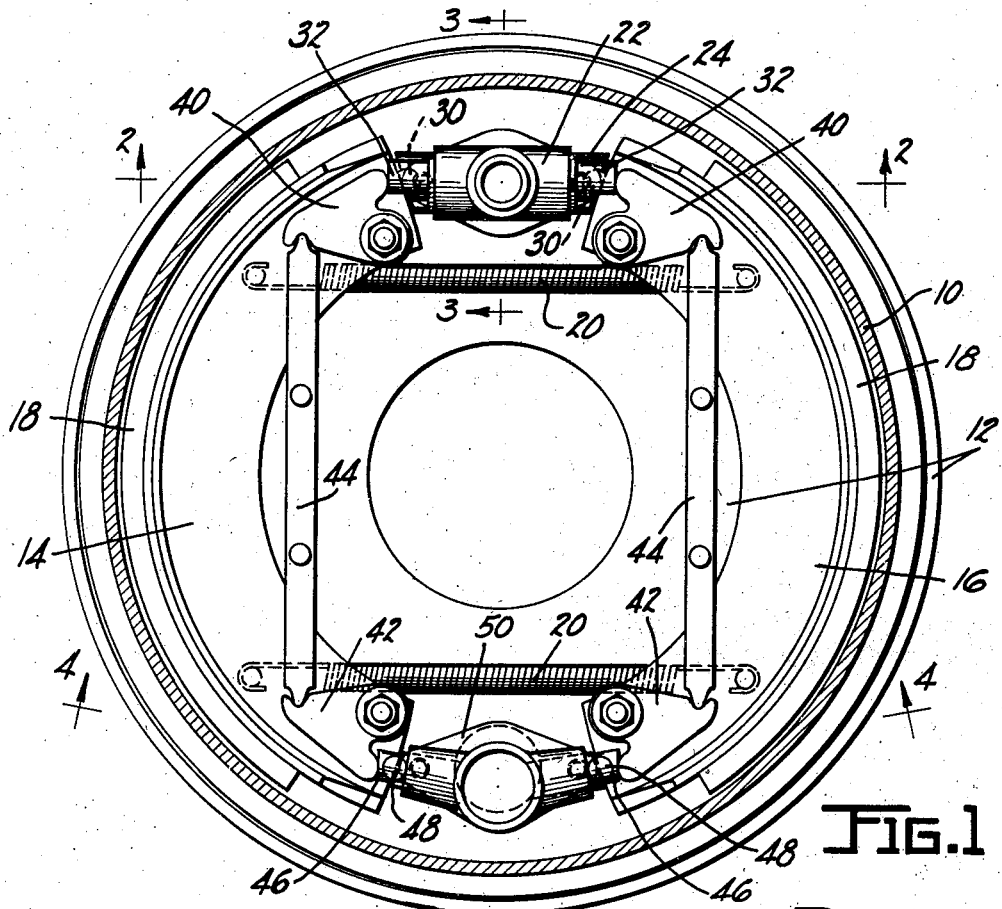
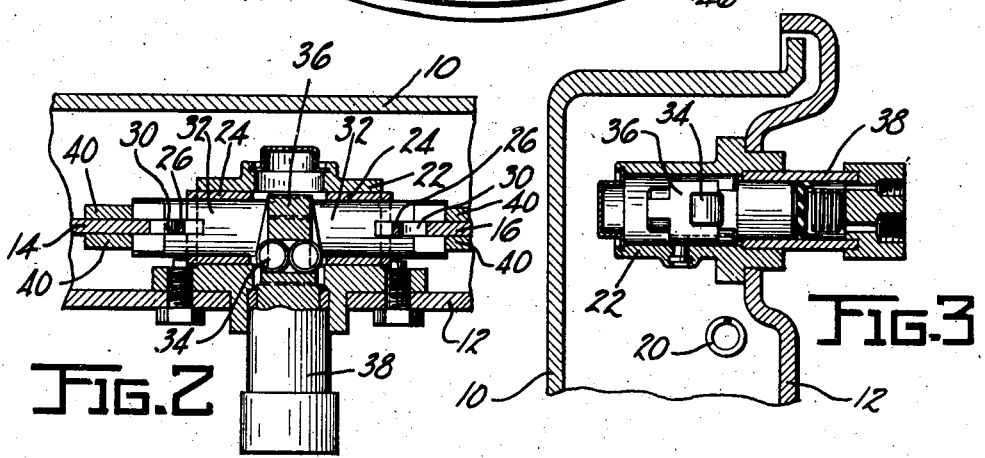
INVENTOR.
JOHN SAMUEL IRVING
BY
ATTORNEY.

Jan. 6, 1942.  J. S. IRVING  2,269,268
BRAKE
Filed June 15, 1939  3 Sheets-Sheet 2
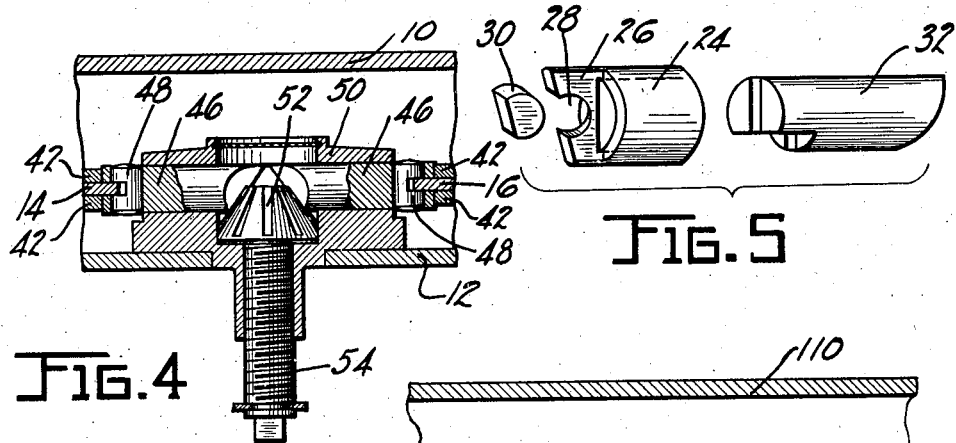
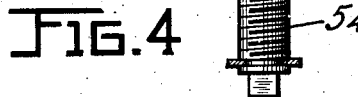
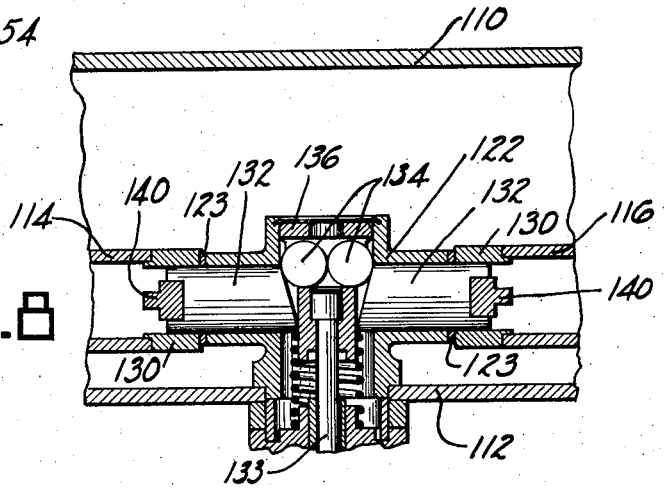
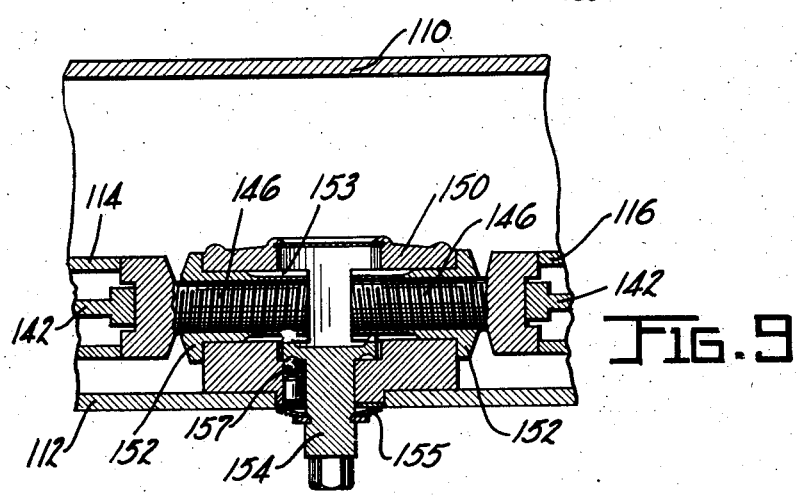
INVENTOR.
JOHN SAMUEL IRVING
BY
ATTORNEY.

INVENTOR.
JOHN SAMUEL IRVING
BY
ATTORNEY.

Patented Jan. 6, 1942

2,269,268

UNITED STATES PATENT OFFICE 2,269,268

BRAKE

John Samuel Irving, Birmingham, England, assignor to Bendix Aviation Corporation, South Bend, Ind., a corporation of Delaware Application June 15, 1939, Serial No. 279,266
In Great Britain September 5, 1938

10 Claims. (Cl. 188—78)

This invention relates to brakes, and is illustrated as embodied in an internal expanding brake for an automobile.

An object of the invention is to provide an improved anchorage of the brake, through a trunnion at one end of the brake shoe which permits some angular movement of the shoe and which has a flat side (e. g. in a plane extending radially of the brake) giving surface-to-surface anchoring engagement. This arrangement permits the shoe to shift slightly radially at its anchored end, to adjust its position to the drum, and gives relatively large anchoring surfaces.

This arrangement is especially advantageous in a brake having two leading shoes, i. e. a brake in which both shoes can shift lengthwise when applied, to anchor at either end, so that both shoes are fully effective in the same manner as the leading shoe of an ordinary brake. A number of features of novelty relate to the adaptation of such a brake to the new anchorage, and to an improvement in the applying means of such a brake.

Figure 6:
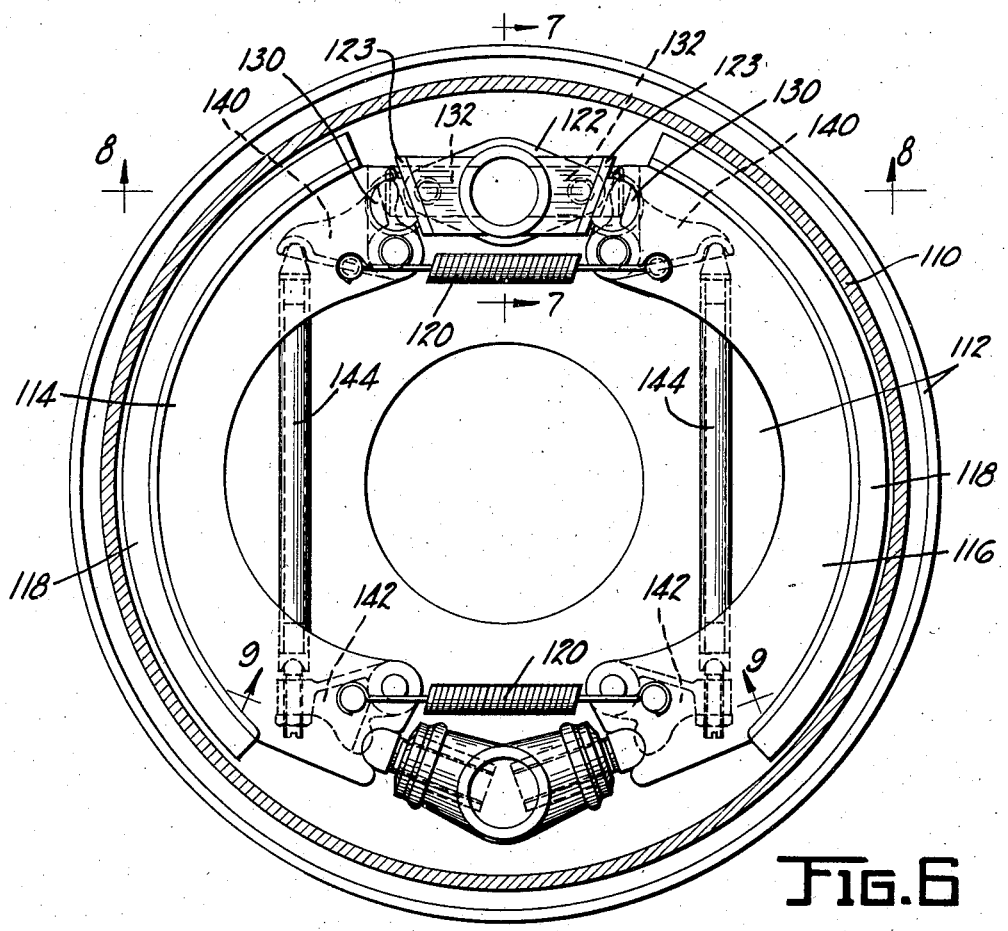
Figure 7:
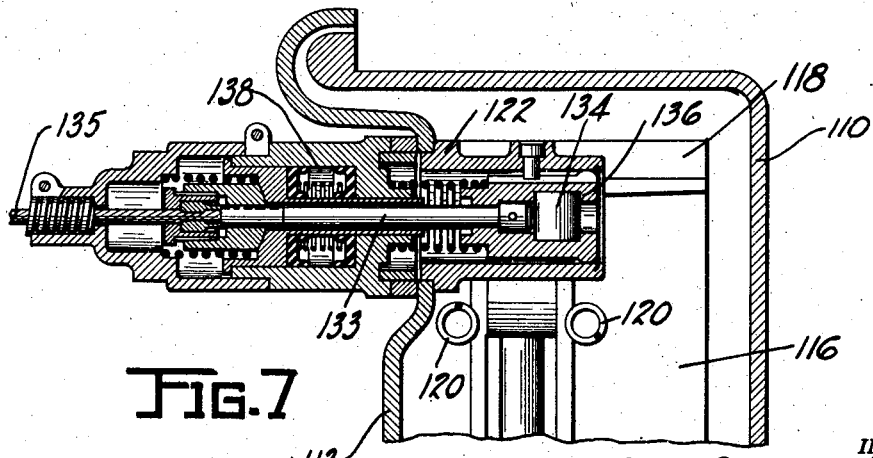

The above and other objects and features of the invention will be apparent from the following description of the illustrative embodiments shown in the accompanying drawings, in which:

Figure 1 is a vertical section through one improved brake emobdying my invention, in a plane just inside the head of the brake drum, and showing the brake shoes in side elevation;

Figures 2, 3 and 4 are partial sections through the brake on the lines 2—2, 3—3, and 4—4 of Figure 1 respectively;

Figure 5 is an exploded view of certain parts adjacent the end of one shoe, and including part of the applying means;

Figure 6 is a section corresponding to Figure 1 but showing a second modification; and Figures 7, 8 and 9 are partial sections on the lines 7—7, 8—8, and 9—9 of Figure 6 respectively.

The drawings illustrate the invention as embodied in brakes of the type having two leading shoes; this type of brake is covered by my United States application No. 189,044, filed February 7, 1938, corresponding to British Patent No. 499,598, accepted January 24, 1939. The United States application has now become Patent No. 2,168,348.

The embodiment illustrated in Figures 1-5 includes a rotatable drum 10, at the open side of which is a support such as a backing plate 12. The friction means of this brake comprises two shoes 14 and 16, T-shaped in section (i. e. each having a single central reinforcing web), faced with the usual brake lining 18. The shoes are connected by return springs 20 tensioned between them.

Between the upper ends of the shoes, the backing plate carries bolted thereto an anchorage comprising a bracket 22 having a circumferential bore in which are fixedly mounted anchorage bushings or sleeve members 24 of the form best shown in Figure 5. The outer ends of these members have vertical integral flat extensions 26 arranged diametrically thereof, and which are formed with curved jaws defining spaces 28 adapted to receive trunnions 30. The trunnions 30 have flat sides which extend radially of the brake and which slidably engage the ends of the shoe webs.

The sleeve members 24 of the anchorage receive brake-applying plungers 32, the outer ends of which are slotted to embrace the extensions 28, the trunnions 30, and the ends of the shoe webs; the slots in each of the plungers 32 is deep enough so that at no time does the bottom of the slot engage the extension 28 to limit the movement of the plunger. The inner ends of the plungers 32 are beveled to form wedges engaged by rollers 34, which are in engagement with each other so they can float laterally and which are arranged in a slot through an operating plunger 36 formed at one end as a hydraulic piston arranged in a wheel cylinder 38.

The outer ends of the plungers 32 operatively engage applying linkages mounted on the shoes and shown as including pairs of bellcrank levers 40 pivoted on opposite sides of the upper ends of the shoe webs. Similar pairs of bellcrank levers 42 are pivoted on the lower ends of the shoe webs, and are respectively connected to the corresponding upper levers 40 by thrust means such as floating links or struts 44.

The bellcrank levers 42 engage and react against adjustable anchorage plungers 46 which are slotted to embrace the lower ends of the shoe webs and which have transverse bores for trunnions 48 grooved to form flat radial surfaces engaged by the lower ends of the shoe webs. The plungers 46 are arranged in bores in an anchor bracket 50 bolted to the backing plate, and are beveled to form wedges seating against the conical end of an adjusting member 52 having a threaded stem 54 extending through the bracket 50 to the exterior of the brake. The outer end of the stem 54 is formed for engagement by a wrench or the like, to force the adjustment member 52 inwardly to wedge the plungers 46 apart to take up for wear of the lining 18. Member 52 is shown as radially grooved, for locking engagement with the ends of the plungers 46 after each adjustment.

In operation, depression of the brake pedal (not shown) operates the usual master cylinder (not shown) to create a pressure in the cylinder 38 to force the plungers 32 apart. These plungers apply force to the bellcrank levers 40, and the reaction of that force is transmitted through links 44 to the levers 42. This tends to force both ends of both shoes against the drum.

However, the friction of the drum causes both shoes to anchor, either on the trunnions 30 or the trunnions 48, at the ends toward which the drum is turning, thereby rendering both shoes as effective as the leading shoe of an ordinary brake. The trunnion anchorages facilitate the slight angular shoe movements necessary, and permit the anchored end of each shoe to shift radially sufficiently to adjust itself automatically to the drum.

In the embodiment of Figures 6-9 parts corresponding to parts of the first embodiment are indicated by the same reference numerals increased by 100.

In this embodiment, the shoes 114 and 116 have spaced reinforcing webs, and the bellcrank levers 140 and 142 connected by the struts 144 are arranged between the two webs of the corresponding shoes. The anchor bracket 122 at the upper ends of the shoes has, at opposite sides, radially arranged wear plates 123 engaged by the flat sides of trunnions 130 mounted in the ends of the shoe webs.

The wedge surfaces on plungers 132 are sloped in the opposite direction from those of plungers 32, and the operating plunger 136 (carrying the transversely-floating inter-engaging rollers 134) is arranged to be actuated by a tension element such as a rod 133 operable either by pressure in a wheel cylinder 138 or by the cable 135 of a Bowden-type mechanical control.

At the lower ends of the shoes, the webs are formed with rounded sockets which engage against generally-cylindrical heads on the outer ends of plungers 146 threaded into adjusting sleeves 152 mounted in the anchor bracket 150, and the levers 142 react against the central flattened portions of these heads. The sleeves 152 are formed with gear teeth 153 meshing with a crown gear integrally formed on the end of the adjusting member 154, so that turning the latter will turn both sleeves simultaneously. The adjustment is locked by a spring washer 155 yieldingly urging one of an annular series of depressions in the base of the crown gear to seat over a locking ball 157.

The operation of this embodiment is the same as that of the first embodiment.

While two illustrative embodiments have been described in detail, it is not my intention to limit the scope of the invention to those particular embodiments, or otherwise than by the terms of the appended claims.

I claim:

1. A device for use in a brake or the like to transmit thrust between a shoe having a web member and an adjacent stationary member, comprising a plunger movably mounted for lengthwise adjustment or movement in said stationary member and having its end slotted and embracing the end of said web member, and a trunnion mounted in the slotted end of said plunger and having angularly-adjustable engagement with the end of one of said members and formed with a flat face engaging the end of the other of said members.

2. A device for use in a brake or the like to transmit thrust between a shoe having a web member and an adjacent stationary member, comprising a plunger movably mounted for lengthwise adjustment or movement in said stationary member and having its end slotted and embracing the end of said web member, and a trunnion mounted in the slotted end of said plunger and formed with a flat face engaging the end of one of said members.

3. A brake comprising a shoe having a web member, a stationary member adjacent one end of the shoe, a trunnion seated in one of said members and formed with a flat face engaged by the other of said members, and applying means acting on the end of the shoe and including a slotted plunger embracing said trunnion and the end of said web member.

4. A brake comprising a shoe having a web member, a stationary member adjacent one end of the shoe, a trunnion seated in one of said members and formed with a flat face engaged by the other of said members, and applying means acting on the end of the shoe and including a plunger formed to clear said trunnion and a linkage mounted on the shoe and actuated by said plunger.

5. A brake having a pair of shoes having anchorages at opposite ends and applying means including linkages mounted on the shoes and permitting the shoes to shift lengthwise when applied to anchor at either end, the anchorages having associated therewith flat-sided trunnions giving surface-to-surface anchoring engagement and at the same time permitting some angular movement of the shoes with respect to the anchorages.

6. A brake having a shoe having anchorages at its opposite ends and having applying means including a linkage mounted on the shoe and permitting the shoe to shift lengthwise when applied to anchor at either end, the anchorages having associated therewith flat-sided trunnions giving surface-to-surface anchoring engagement and at the same time permitting some angular movement of the shoe with respect to the anchorages, the trunnions having substantially flat sides engaging the ends of the shoes and curved sides fitting in corresponding grooves in the anchorages.

7. A brake comprising a shoe having spaced web members at least at its ends, bellcrank levers mounted on the ends of the shoe between said web members, thrust means connecting said levers and balancing the thrust on one lever against the reaction of the other, an applying device acting on one lever, an anchorage member adjacent the applying device, a second anchorage member engaged by the other of said levers, and trunnions through which the web members anchor on the anchorage members and which have flat sides giving surface-to-surface anchoring engagement radially of the brake.

8. A brake comprising a shoe having spaced web members at least at its ends, bellcrank levers mounted on the ends of the shoe between said web members, thrust means connecting said levers and balancing the thrust on one lever against the reaction of the other, an applying device acting on one lever, an anchorage member adjacent the applying device, and a second anchorage member engaged by the other of said levers, said shoe being shiftable lengthwise when applied to anchor at either end on one of the anchorage members.

9. A brake having a pair of shoes having anchorages at opposite ends and applying means permitting the shoes to shift lengthwise when applied to anchor at either end, the anchorages having sockets therein and having flat-sided trunnions in the sockets giving surface-to-surface anchoring engagement and at the same time permitting some angular movement of the shoes with respect to the anchorages.

10. A brake having a pair of floating shoes having socket-forming anchorages at opposite ends and applying means permitting the shoes to shift lengthwise and to anchor at either end, the anchorages having associated therewith in the sockets flat-sided trunnions giving surface-to-surface anchoring engagement and at the same time permitting by turning in the sockets some angular movement of the shoes with respect to the anchorages.

JOHN SAMUEL IRVING.